(12) United States Patent
Watanabe et al.

(10) Patent No.: US 7,826,070 B2
(45) Date of Patent: Nov. 2, 2010

(54) SCANNING OPTICAL SYSTEM ADJUSTING DEVICE AND SCANNING OPTICAL SYSTEM ADJUSTING METHOD

(75) Inventors: Wataru Watanabe, Shizuoka-ken (JP); Kazutoshi Takahashi, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 516 days.

(21) Appl. No.: 11/840,374

(22) Filed: Aug. 17, 2007

(65) Prior Publication Data

US 2009/0046341 A1 Feb. 19, 2009

(51) Int. Cl.
*G01B 11/14* (2006.01)
(52) U.S. Cl. ...................... 356/622; 356/138
(58) Field of Classification Search ........................ None
See application file for complete search history.

(56) References Cited

U.S. PATENT DOCUMENTS 6,310,711 B1 * 10/2001 Kobayashi et al. ....... 359/216.1
6,611,279 B2 * 8/2003 Komiya et al. ............... 347/235
7,245,311 B2 * 7/2007 Hayashi et al. ............. 347/131
2004/0066519 A1 * 4/2004 Kotani ......................... 356/510
2005/0146595 A1 * 7/2005 Miura ........................... 347/235

FOREIGN PATENT DOCUMENTS

JP 2000-214400 8/2000
JP 2005257882 A * 9/2005

* cited by examiner

*Primary Examiner*—Gregory J Toatley, Jr.
*Assistant Examiner*—Juan D Valentin
(74) *Attorney, Agent, or Firm*—Turocy & Watson, LLP (57) ABSTRACT

As a light beam of a scanning optical system unit is adjusted in the state where the scanning optical system unit is assembled, its adjustment work and the assembly work of the scanning optical system are prevented from being useless. Thus, a scanning optical system adjusting device which can adjust the scanning optical system quickly and at a low cost is to be provided. A scanning optical system adjusting device according to the invention includes a static angle control unit configured to maintain a rotation angle of a rotary polygon mirror in the assembly unit of the scanning optical system at a predetermined angle and make the rotary polygon mirror static there, and a light beam parameter measuring unit configured to measure a predetermined parameter of a light beam reflected by the rotary polygon mirror maintained at the predetermined angle by the static angle control unit.

20 Claims, 6 Drawing Sheets

SCANNING OPTICAL SYSTEM ADJUSTING DEVICE AND SCANNING OPTICAL SYSTEM ADJUSTING METHOD

BACKGROUND OF THE INVENTION

1. Field of the Related Art

The present invention relates to a scanning optical system adjusting device and a scanning optical system adjusting method, and particularly to a technique which enables adjustment of a scanning optical system in the state where a scanning optical system of, for example, an image forming apparatus or the like, is assembled as a unit.

2. Description of the Related Art

A scanning optical system of an image forming apparatus must be adjusted to provide a theoretically correct optical axis position and beam diameter. Therefore, various adjustments must be made including adjustment of the optical axis, attachment error of components and semiconductor laser, optical face tangle error of a rotary polygon mirror, and attachment error of an fθ lens.

Figure 7:
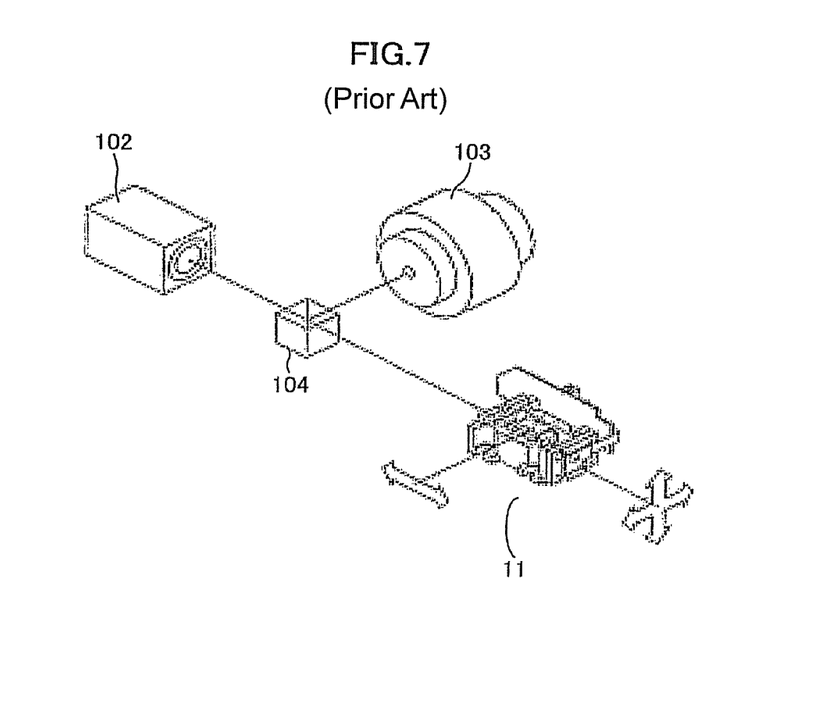
FIG. 7 is a schematic view showing a method of adjusting a scanning optical system in a traditional technique.

In a traditional adjusting method, first, as shown in FIG. 7, a position detection device 102 and a beam diameter measuring unit 103 are provided facing a laser unit 11, at distance positions corresponding to installation positions of photoconductors, not shown, and a light beam cast from the laser unit 11 is split by a beam splitter 104 and made incident on each of them. Then, the position of the optical axis of the light beam is adjusted while it is detected by the position detection device 102, and at the same time, the diameter of the light beam is adjusted while it is measured by the beam diameter measuring unit 103. After that, as shown in FIG. 8, the laser unit 11 is incorporated as a scanning optical system and a scanning optical system assembly unit 1 is thus provided.

Figure 8:
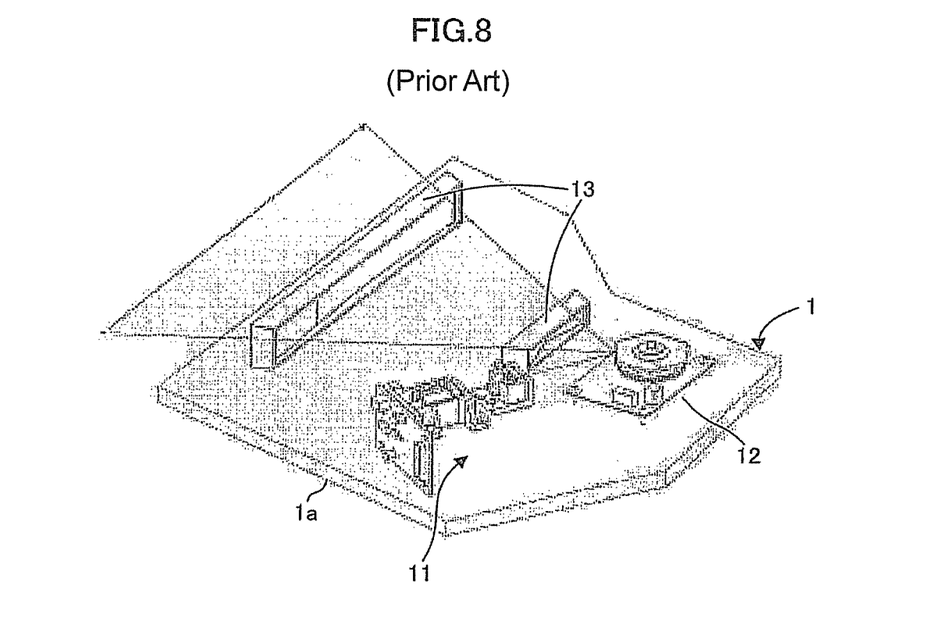
FIG. 8 is a perspective view showing a scanning optical system unit in the traditional technique.

However, in the case where the adjustments for the light beam of the semiconductor laser (laser unit 11) are made separately from the incorporation of the scanning optical system assembly unit 1, when the semiconductor laser is incorporated in the scanning optical system, the dimension and attachment accuracy of the components such as a casing 1a, a rotary polygon mirror 12 and an fθ lens 13 shown in FIG. 8 cause inconvenience that the light beam does not exit to a theoretically correct optical axis position that is adjusted before the assembly of the unit or inconvenience that the beam diameter cannot be adjusted to a prescribed value.

In such a case, a work of readjusting the beam position and beam diameter and reassembling the unit is required. The assembly of the unit and the adjustment must be repeated. Therefore, there is a problem that the preparation of the scanning optical system unit requires much time and cost.

SUMMARY OF THE INVENTION

In view of the foregoing problems, it is an object of the invention to provide a scanning optical system adjusting device and a scanning optical system adjusting method in which a light beam of a scanning optical system unit is adjusted in the state where the scanning optical system unit is assembled, thereby enabling adjustments including adjustment of errors generated in incorporation to the unit, and eliminating the useless adjustment work and assembly work of the scanning optical system as seen in the traditional technique, and thus enabling adjustment of the scanning optical system quickly and at a low cost.

To solve the foregoing problems, according to an aspect of the invention, a scanning optical system adjusting device is for making adjustment of a scanning optical system having a light emitting unit configured to emit a light beam, a rotary polygon mirror configured to cause the light beam emitted by the light emitting unit to perform scanning, and an adjusting mechanism configured to adjust the light beam emitted by the light emitting unit, in an assembly unit of the scanning optical system. The scanning optical system adjusting device includes: a static angle control unit configured to maintain a rotation angle of the rotary polygon mirror in the assembly unit of the scanning optical system at a predetermined angle and make the rotary polygon mirror static there; and a light beam parameter measuring unit arranged in a predetermined positional relation with the assembly unit of the scanning optical system and configured to measure a predetermined parameter of a light beam reflected by the rotary polygon mirror maintained at the predetermined angle by the static angle control unit.

Also, according to another aspect of the invention, a scanning optical system adjusting device is for making adjustment of a scanning optical system having light emitting means for emitting a light beam, scanning means for causing the light beam emitted by the light emitting means to perform scanning, and an adjusting mechanism configured to adjust the light beam emitted by the light emitting means, in an assembly unit of the scanning optical system. The scanning optical system adjusting device includes: static angle control means for maintaining a rotation angle of the scanning means in the assembly unit of the scanning optical system at a predetermined angle and make the scanning means static there; and light beam parameter measuring means arranged in a predetermined positional relation with the assembly unit of the scanning optical system and for measuring a predetermined parameter of a light beam reflected by the scanning means maintained at the predetermined angle by the static angle control means.

Moreover, according to still another aspect of the invention, a scanning optical system adjusting method is for making adjustment of a scanning optical system having a light emitting unit configured to emit a light beam, a rotary polygon mirror configured to cause the light beam emitted by the light emitting unit to perform scanning, and an adjusting mechanism configured to adjust the light beam emitted by the light emitting unit, in an assembly unit of the scanning optical system. The scanning optical system adjusting method includes: maintaining a rotation angle of the rotary polygon mirror in the assembly unit of the scanning optical system at a predetermined angle and making the rotary polygon mirror static there; and measuring a predetermined parameter of a light beam reflected by the rotary polygon mirror.

DESCRIPTION OF THE EMBODIMENT

Hereinafter, an embodiment of the invention will be described with reference to the drawings.

Figure 1:
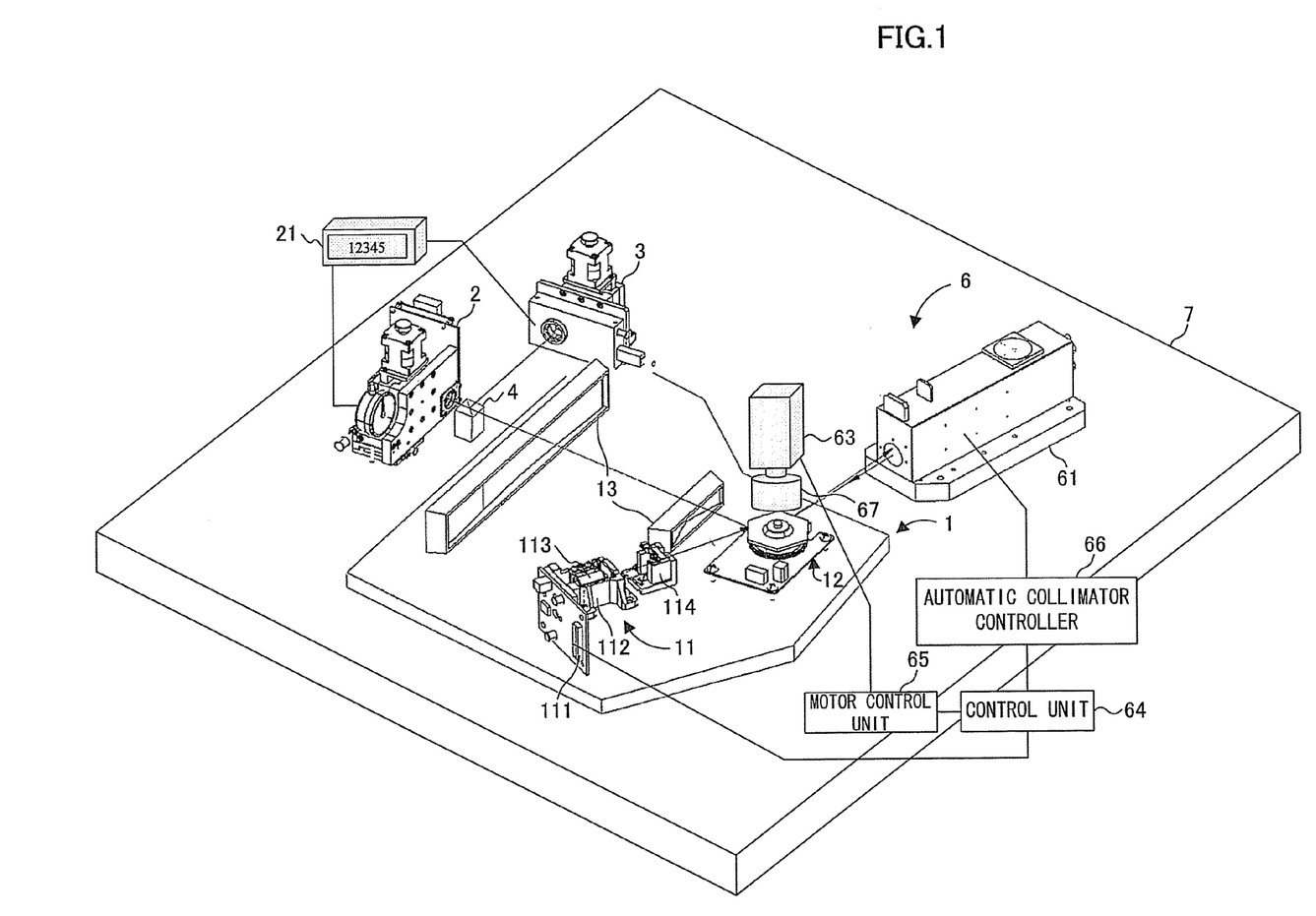
FIG. 1 is an overall perspective view showing a scanning optical system adjusting device and method according to an embodiment of the invention.

FIG. 1 is an overall perspective view showing a scanning optical system adjusting device and method in the embodiment of the invention.

This scanning optical system adjusting device has a position detection device 2 and a beam diameter measuring unit 3 arranged in a predetermined positional relation with a scanning optical system assembly unit 1 having a scanning optical system assembled therein, a beam splitter (corresponding to beam splitting means of the invention) 4 which splits a light beam from the scanning optical system assembly unit 1 and guides the split light beam to the position detection device and the beam diameter measuring unit, a static angle control unit 6 which maintains the rotation angel of a rotary polygon mirror 12 forming the scanning optical system assembly unit 1, which will be described later, at a predetermined angle and makes the rotary polygon mirror static there, and a supporting stage 7 on which these units are arranged and supported.

Here, the position detection device (corresponding to a position measuring unit or position measuring means of the invention) 2 and the beam diameter measuring unit (corresponding to beam diameter measuring means) 3 form a light beam parameter measuring unit (light beam parameter measuring means) of the invention.

The scanning optical system assembly unit 1 has a laser unit (corresponding to a light emitting unit or light emitting means of the invention) 11 which emits a light beam, a rotary polygon mirror (corresponding to scanning means of the invention) 12 which causes the light beam emitted by the laser to perform scanning, and an fθ lens 13 which condenses the light beam reflected by the rotary polygon mirror 12 and guides it to a photoconductor (image carrier) not shown.

The laser unit 11 has a semiconductor laser 112 which is driven by a laser driving unit 111, a focus adjustment lens 113, and a cylindrical lens 114. The laser unit has an optical axis adjusting mechanism for adjusting the optical axis position of a light beam and a beam diameter adjusting mechanism for adjusting the beam diameter, which will be described later.

Figure 2:
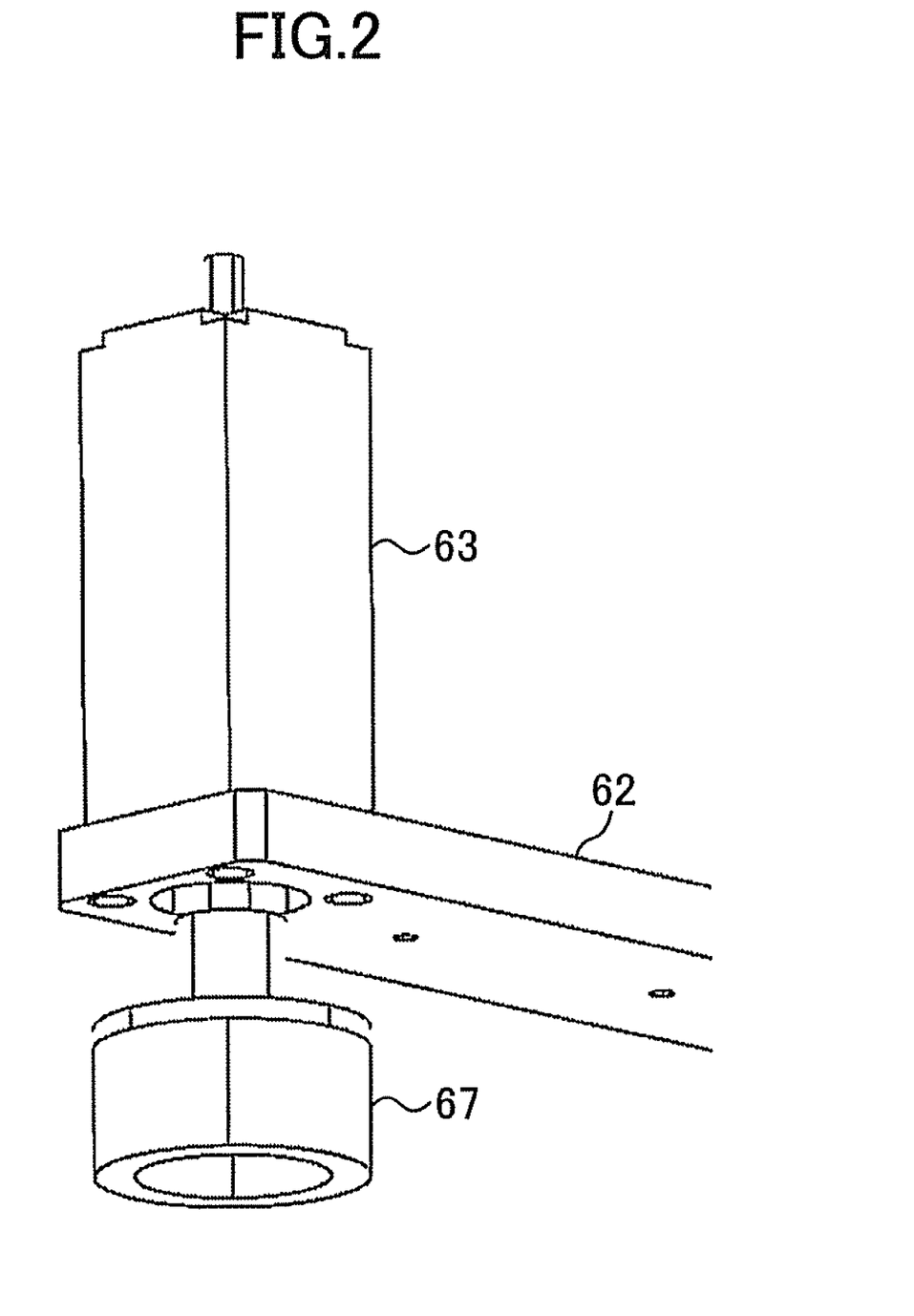
FIG. 2 is a perspective view showing a static angle control unit (means).

The static angle control unit (corresponding to static angle control means of the invention) 6 has a laser automatic collimator (an angle measuring unit or angle measuring means of the invention) 61 which detects the rotation angle of the rotary polygon mirror, a stepping motor (corresponding to a static angle adjusting motor or static angle adjusting means of the invention) 63 supported at the distal end of an arm 62 extending above the rotary polygon mirror as shown in FIG. 2, and a control unit 64, a motor control unit 65 and an automatic collimator controller 66 as a control mechanism to control the stepping motor 63 in accordance with a detection value of the laser automatic collimator 61. At the distal end of an output shaft of the stepping motor 63, a holding unit (corresponding to holding means of the invention) 67 is provided which holds (supports) the upper surface of the rotary polygon mirror 12, sets the rotation angle of the rotary polygon mirror 12 at a predetermined angle, and makes it static. This holding unit 67 has an elastic rubber or sponge and flexibly supports the rotary polygon mirror 12 so as not to apply shock to it. The predetermined angle at which the rotary polygon mirror 12 is made static is the angle at which a light beam of the laser becomes incident on the position detection device 2 and the beam diameter measuring unit 3 via the beam splitter 4. The angle is corresponds to the angle of irradiation on the photoconductor in the image forming apparatus, not shown.

The scanning optical system assembly unit 1, the position detection device 2, the beam diameter measuring unit 3, and the laser automatic collimator 61 are arranged on the supporting stage (corresponding to supporting means of the invention) 7 where their respective arrangement positions are defined so that the setting of their positional relations may be easy.

Figure 3:
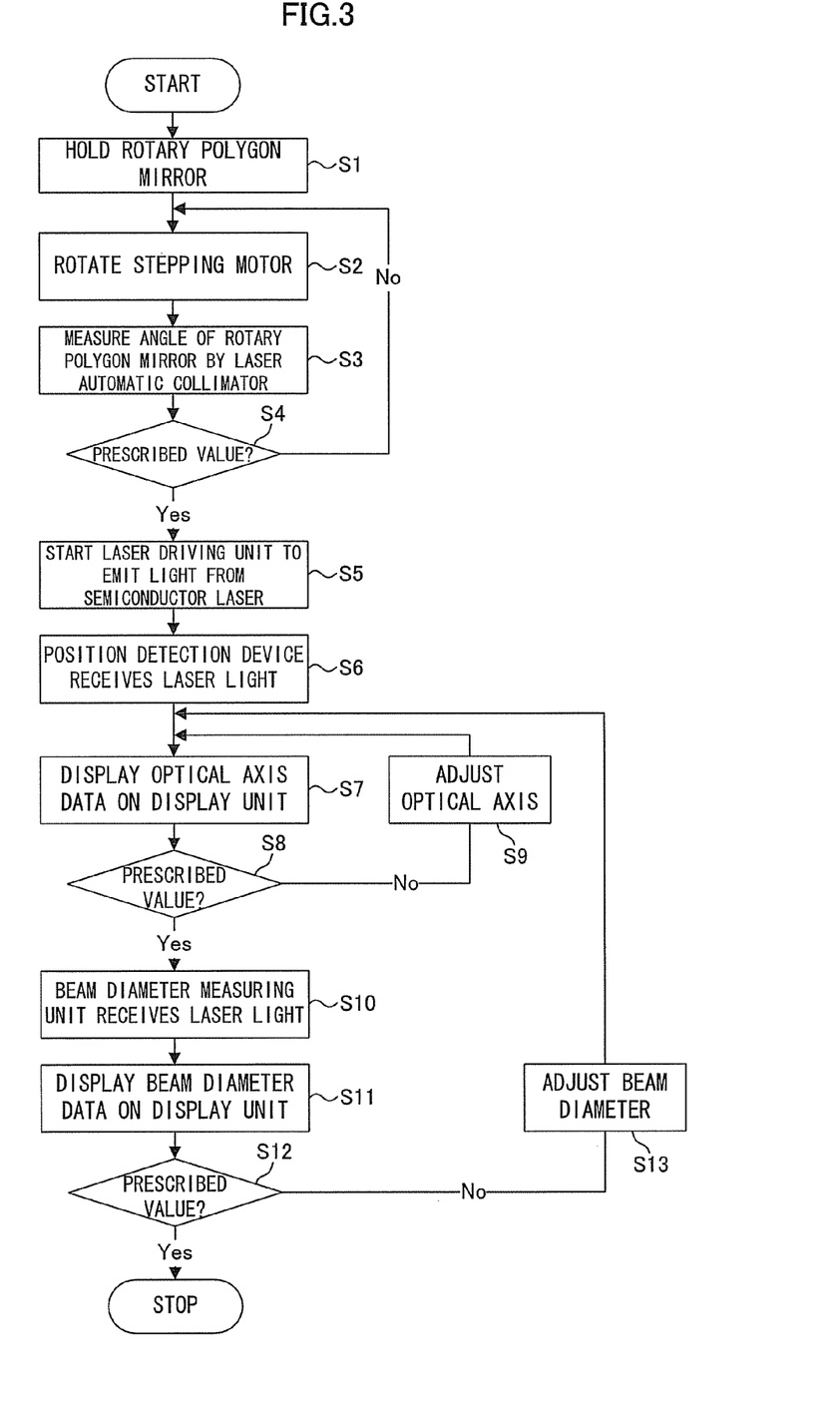
FIG. 3 is a flowchart showing the operation in the embodiment.

The operation in the embodiment of the invention with the above-described configuration will be described hereinafter with reference to the flowchart of FIG. 3.

First, the upper part of the rotary polygon mirror is held by the holding unit of the stepping motor (step S1). The stepping motor 63 is rotated so that the rotation angle of the rotary polygon mirror 12 found by the laser automatic collimator 61 reaches a predetermined angle, and the rotary polygon mirror is controlled at the predetermined angle (steps S2 to S4).

When the static rotation angle of the rotary polygon mirror 12 is decided, the control unit 64 starts the laser driving unit 111 to start irradiation with a light beam by the semiconductor laser 112 (step S5). The position detection device 2 outputs a light receiving signal of the light beam (step S6). A display unit 21 displays optical axis position data (step S7). Then, whether this optical axis position is a prescribed value or not is determined (step S8). Adjustment of the optical axis is made by the operator until the optical axis position reaches the prescribed value (step S9). That is, the processing of steps S7 to S9 is repeated until the adjustment of the optical axis ends. The adjustment of the optical axis position is thus made by the adjustment operator.

Figure 4:
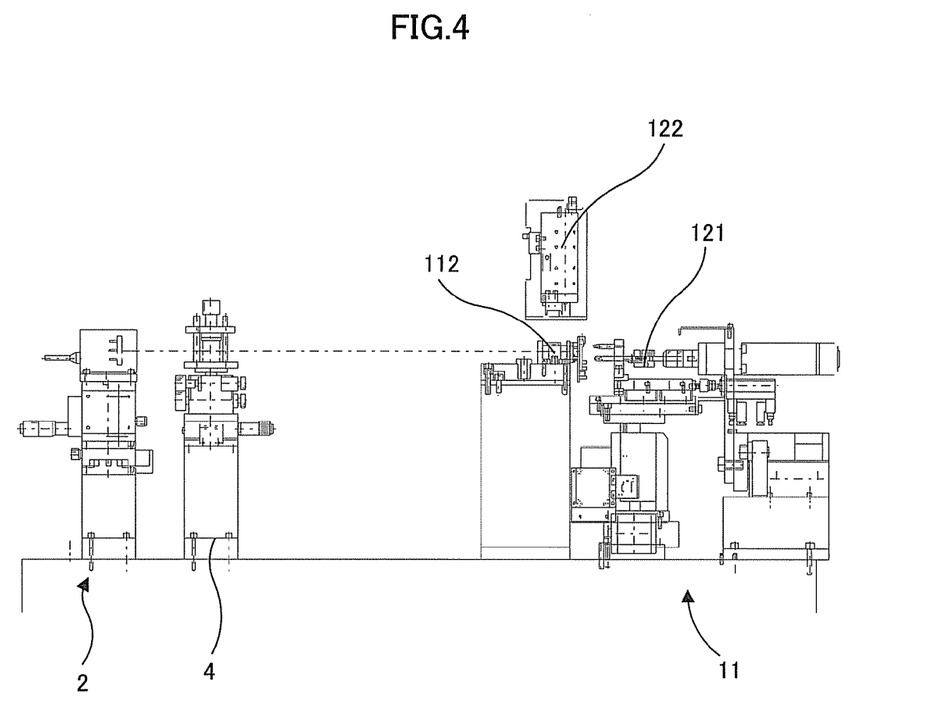
FIG. 4 is a front view showing a laser unit and a measuring system.
Figure 5:
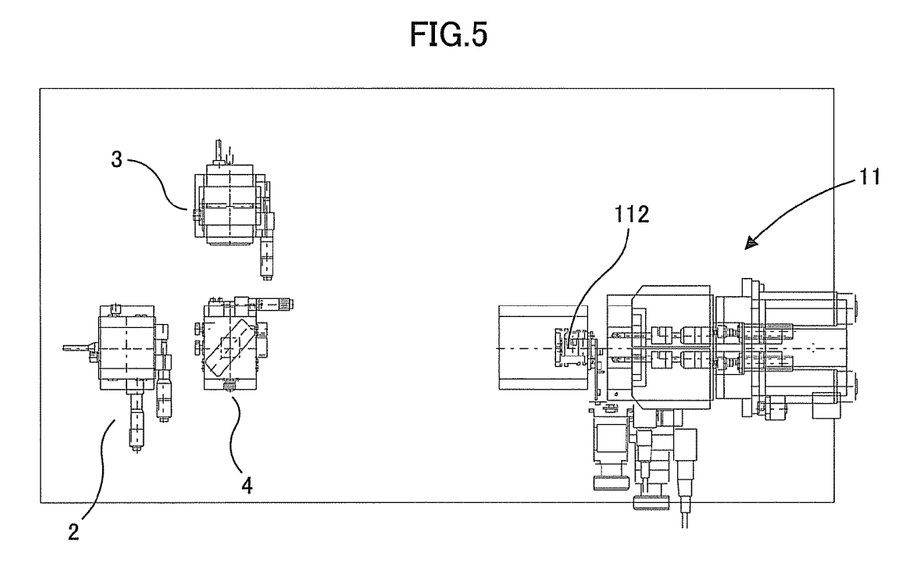
FIG. 5 is a plan view showing the laser unit and the measuring system of FIG. 4.
Figure 6:
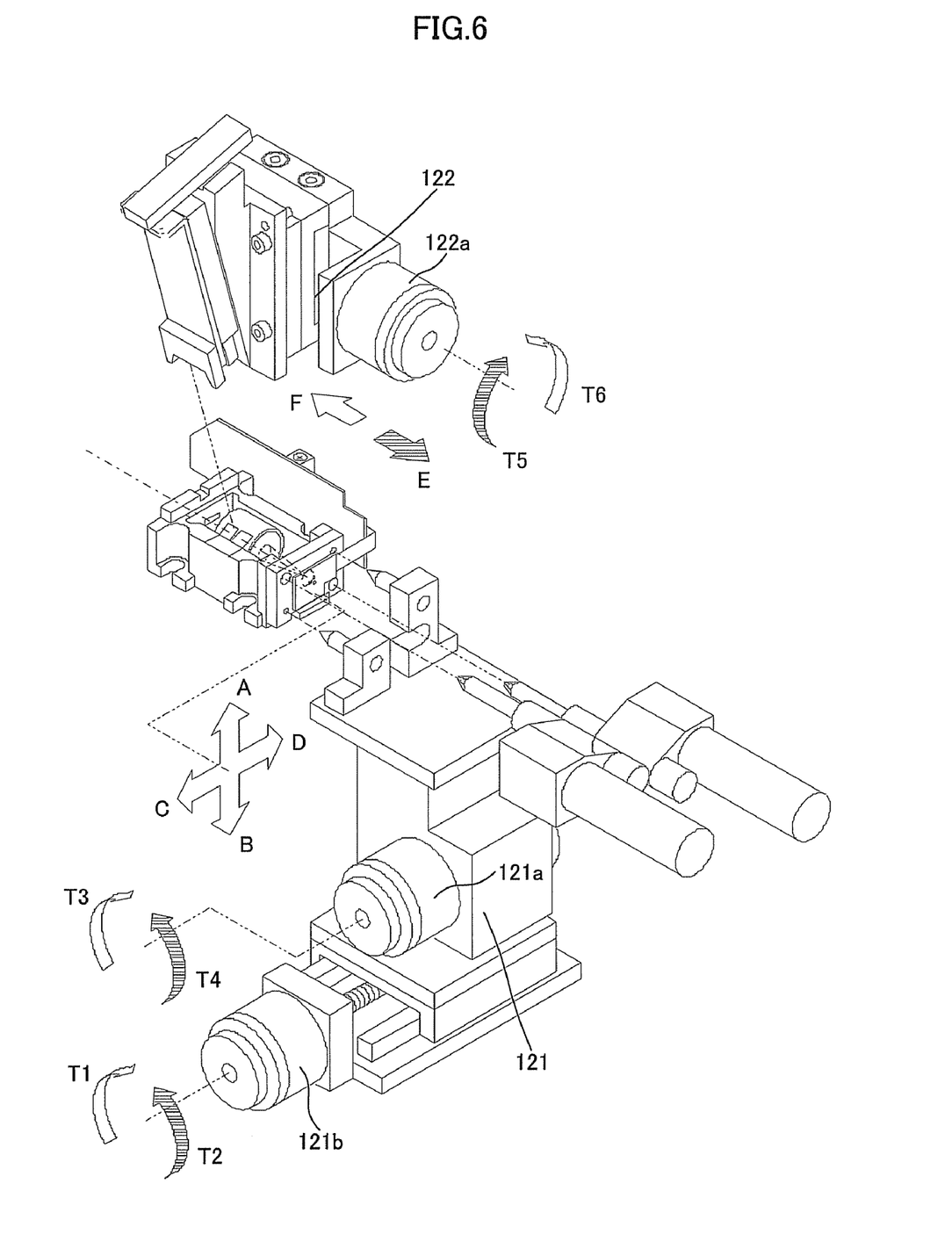
FIG. 6 is a perspective view showing a method for adjusting the laser unit.

The optical axis adjusting work will be described with reference to FIG. 4 to FIG. 6. FIG. 4 is a front view showing the laser unit and the measuring system. FIG. 5 is a plan view of the same. FIG. 6 is a perspective view showing a method for adjusting the laser unit.

The laser unit 11 has an optical axis position adjusting mechanism 121 and a focus adjusting mechanism 122, as adjusting mechanisms for a light beam. In the adjustment of the optical axis position in step S9, adjustment knobs 121*a* and 121*b* of the optical axis position adjusting mechanism 121 shown in FIG. 6 are rotated in either T1 or T2 direction and in either T3 or T4 direction, respectively, and the optical axis position can thus be moved in one of A to D directions shown in FIG. 6.

When the optical axis position has reached a predetermined value (step S8, Y), then, the beam diameter measuring unit 3 outputs a light receiving signal of the light beam (step S10) and the display unit 21 displays the beam diameter (step S11). Then, whether this beam diameter is a prescribed value or not is determined (step S12). Adjustment of the beam diameter by the adjustment operator is carried out until the beam diameter reaches the prescribed value (step S13, steps S7 to S12).

This adjustment of the beam diameter is made by rotating an adjustment knob 122*a* of the focus adjusting mechanism 122 shown in FIG. 6 in either T5 or T6 direction.

In the case where the value of the beam diameter does not reach the prescribed value, the processing of steps S7 to S12 is repeated until it reaches the prescribed value. Then, in the case where both the optical axis position and the beam diameter have reaches their respective prescribed values, the adjustment work processing ends.

According to the embodiment of the invention described above in detail, a light beam of the scanning optical system assembly unit 1 is adjusted in the state where the scanning optical system assembly unit is assembled. Thus, adjustment can be made in the state where all the dimensional difference of each component and the difference in assembly can be dealt with. The adjustment work and the assembly work of the scanning optical system can be prevented from being useless as in the traditional technique. Easy and efficient adjustment work can be carried out. Thus, adjustment of the scanning optical system can be made quickly and at a low cost.

In the embodiment, the adjustment of the optical axis position and the adjustment of the beam diameter are described as adjustment items. These adjustments consequently include adjustment of attachment error of the components and semiconductor laser, optical face tangle error of the rotary polygon mirror, and attachment error of the fθ lens. Thus, efficient adjustment work can be realized.

What is claimed is:

1. A scanning optical system adjusting device for making adjustment of a scanning optical system which has a light emitting unit emitting a light beam, a rotary polygon mirror causing the light beam emitted by the light emitting unit to perform scanning, and an adjusting mechanism adjusting the light beam emitted by the light emitting unit, in an assembly unit of the scanning optical system, the scanning optical system adjusting device comprising:
   a static angle control unit stopping the rotation of the rotary polygon mirror to maintain a rotation angle of the rotary polygon mirror in the assembly unit of the scanning optical system at a predetermined angle; and
   a light beam parameter measuring unit arranged in a predetermined positional relation with the assembly unit of the scanning optical system and measuring a predetermined parameter of the light beam reflected by the rotary polygon mirror maintained at the predetermined angle by the static angle control unit.

2. The scanning optical system adjusting device according to claim 1, wherein the light beam parameter measuring unit includes a position measuring unit which is arranged in a predetermined positional relation with the assembly unit of the scanning optical system and measures a position of irradiation with the light beam reflected by the rotary polygon mirror.

3. The scanning optical system adjusting device according to claim 1, wherein the light beam parameter measuring unit includes a beam diameter measuring unit which is arranged in a predetermined positional relation with the assembly unit of the scanning optical system and measures a beam diameter of the light beam reflected by the rotary polygon mirror.

4. The scanning optical system adjusting device according to claim 1, wherein the static angle control unit has,
   an angle measuring unit arranged in a predetermined positional relation with the assembly unit of the scanning optical system and measuring an angle of the rotary polygon mirror, and
   a static angle adjusting motor adjusting a rotation angle at which the rotary polygon mirror becomes static in accordance with a measured value of the angle measuring unit.

5. The scanning optical system adjusting device according to claim 1, wherein the static angle adjusting motor includes:
   a stepping motor;
   a driving shaft of the stepping motor; and
   a holding unit provided at a distal end of the driving shaft and holding the rotary polygon mirror by being abutted against the rotary polygon mirror.

6. The scanning optical system adjusting device according to claim 1, further comprising a beam splitter which splits the light beam reflected from the rotary polygon mirror into two light beams and causes the respective light beams to be incident on the position measuring unit and the beam diameter measuring unit.

7. The scanning optical system adjusting device according to claim 1, further comprising a supporting stage integrally supporting the assembly unit and the light beam parameter measuring unit and setting their arrangement positions, so that the light beam parameter measuring unit is arranged in a predetermined positional relation with the assembly unit of the scanning optical system.

8. The scanning optical system adjusting device according to claim 1, wherein the scanning optical system unit is a unit used for an image forming apparatus which forms a static image on an image carrier, and the light beam parameter measuring unit is arranged at a position equivalent to a position where the image carrier is arranged.

9. A scanning optical system adjusting device for making adjustment of a scanning optical system which has light emitting means for emitting a light beam, scanning means for causing the light beam emitted by the light emitting means to perform scanning using a rotary polygon mirror, and an adjusting mechanism adjusting the light beam emitted by the light emitting means, in an assembly unit of the scanning optical system, the scanning optical system adjusting device comprising:
   static angle control means for stopping the rotation of the rotary polygon mirror to maintain a rotation angle of the scanning means in the assembly unit of the scanning optical system at a predetermined angle; and
   light beam parameter measuring means arranged in a predetermined positional relation with the assembly unit of the scanning optical system and for measuring a predetermined parameter of the light beam reflected by the scanning means maintained at the predetermined angle by the static angle control means.

10. The scanning optical system adjusting device according to claim 9, wherein the light beam parameter measuring means includes position measuring means arranged in a predetermined positional relation with the assembly unit of the scanning optical system and for measuring a position of irradiation with the light beam reflected by the scanning means.

11. The scanning optical system adjusting device according to claim 9, wherein the light beam parameter measuring means includes beam diameter measuring means arranged in a predetermined positional relation with the assembly unit of the scanning optical system and for measuring a beam diameter of the light beam reflected by the scanning means.

12. The scanning optical system adjusting device according to claim 9, wherein the static angle control means has angle measuring means arranged in a predetermined positional relation with the assembly unit of the scanning optical system and for measuring an angle of the scanning means, and static angle adjusting means for adjusting a rotation angle at which the scanning means becomes static in accordance with a measured value of the angle measuring means.

13. The scanning optical system adjusting device according to claim 9, wherein the static angle adjusting means includes:
   a stepping motor;
   a driving shaft of the stepping motor; and
   a holding means provided at the distal end of the driving shaft and holding the scanning means by being abutted against the scanning means.

14. The scanning optical system adjusting device according to claim 9, comprising beam splitting means for splitting the light beam reflected from the scanning means into two light beams and causing the respective light beams to be incident on the position measuring means and the beam diameter measuring means.

15. The scanning optical system adjusting device according to claim 9, comprising supporting means for integrally supporting the assembly unit and the light beam parameter measuring means and setting their arrangement positions, so that the light beam parameter measuring means is arranged in a predetermined positional relation with the assembly unit of the scanning optical system.

16. A scanning optical system adjusting method for making adjustment of a scanning optical system which has a light emitting unit emitting a light beam, a rotary polygon mirror causing the light beam emitted by the light emitting unit to perform scanning, and an adjusting mechanism adjusting the light beam emitted by the light emitting unit, in an assembly unit of the scanning optical system, the scanning optical system adjusting method comprising:

stopping the rotation of the rotary polygon mirror to maintain a rotation angle of the rotary polygon mirror in the assembly unit of the scanning optical system at a predetermined angle; and measuring a predetermined parameter of a light beam reflected by the rotary polygon mirror maintained at the predetermined angle.

17. The scanning optical system adjusting method according to claim 16, wherein a position of irradiation with the light beam reflected by the rotary polygon mirror is measured as the predetermined parameter.

18. The scanning optical system adjusting method according to claim 16, wherein a beam diameter of the light beam reflected by the rotary polygon mirror is measured as the predetermined parameter.

19. The scanning optical system adjusting method according to claim 16, wherein in order to maintain a rotation angle of the rotary polygon mirror in the assembly unit of the scanning optical system at a predetermined angle and make the rotary polygon mirror static there, an angle of the rotary polygon mirror is measured and the rotation angle at which the rotary polygon mirror becomes static is adjusted in accordance with the measured value.

20. The scanning optical system adjusting method according to claim 16, wherein the light beam reflected from the rotary polygon mirror is split into two light beams, measurement of the position of each light beam and measurement of the beam diameter is carried out.

\* \* \* \* \*